US012635085B2

(12) United States Patent　　　　　(10) Patent No.:　　US 12,635,085 B2
Kao et al.　　　　　　　　　　　　　　(45) Date of Patent:　　　May 19, 2026

(54) ELECTRONIC ASSEMBLY WITH THEFT PREVENTION MECHANISM AND DATA THEFT PREVENTION METHOD FOR ELECTRONIC ASSEMBLY

(71) Applicant: WISTRON CORPORATION, New Taipei City (TW)

(72) Inventors: Yi Sheng Kao, New Taipei City (TW); Po Liang Huang, New Taipei City (TW); Xiaozhang Lin, New Taipei City (TW)

(73) Assignee: WISTRON CORPORATION, New Taipei City (TW)

( * ) Notice: Subject to any disclaimer, the term of this patent is extended or adjusted under 35 U.S.C. 154(b) by 95 days.

(21) Appl. No.: 18/756,542

(22) Filed: Jun. 27, 2024

(65) Prior Publication Data

US 2025/0247970 A1　　　Jul. 31, 2025

(30) Foreign Application Priority Data

Jan. 25, 2024　　(TW) ................................. 113103007

(51) Int. Cl.
　　H05K 5/02　　　　(2006.01)
　　G06F 21/62　　　　(2013.01)
(52) U.S. Cl.
　　CPC ....... H05K 5/0208 (2013.01); G06F 21/6218 (2013.01)
(58) Field of Classification Search
　　CPC .............................. G06F 21/62; H05K 5/0208
　　See application file for complete search history.

(56) References Cited

U.S. PATENT DOCUMENTS

2004/0124980 A1* 7/2004 Sisson .................. G08B 13/149
　　　　　　　　　　　　　　　　　　　　　340/568.1
2006/0255573 A1 11/2006 Tobata et al.

FOREIGN PATENT DOCUMENTS

CN　　　103325198 A　　9/2013
CN　　　112993645 A　　6/2021
JP　　　2018058549 A　　4/2018

OTHER PUBLICATIONS

Extended European Search Report for Application No. 24195874.3, dated Jan. 31, 2025, 8 Pages.

* cited by examiner

*Primary Examiner* — Jerry Wu
(74) *Attorney, Agent, or Firm* — Brooks Kushman P.C.

(57)　　　　　　　ABSTRACT

An electronic assembly with a theft prevention mechanism includes a housing, a circuit board assembly, at least one trigger element, and an airbag assembly. The circuit board assembly is disposed on an inner wall of the housing. The at least one trigger element is disposed on the inner wall of the housing. The airbag assembly is disposed within the housing and includes at least one airbag. In a normal operating state, the at least one airbag presses against the at least one trigger element. A data theft prevention method for an electronic assembly includes generating a trigger signal in response to a detected change in a volume of the at least one airbag and executing a data protecting procedure in response to the trigger signal.

8 Claims, 6 Drawing Sheets

600

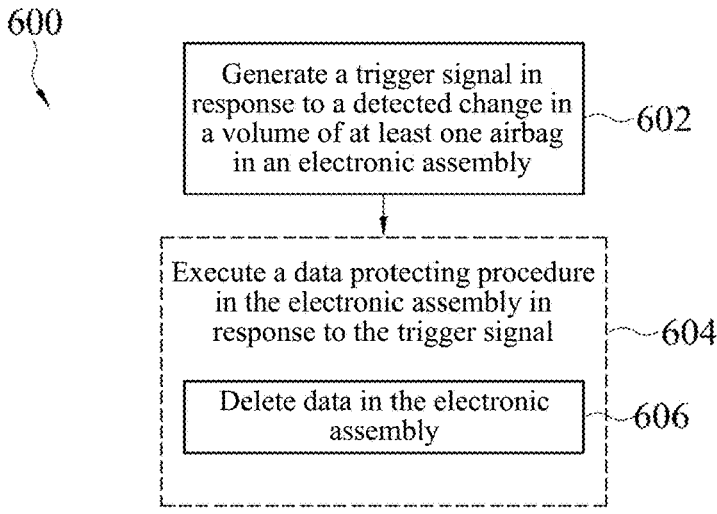

Generate a trigger signal in response to a detected change in a volume of at least one airbag in an electronic assembly —602

Execute a data protecting procedure in the electronic assembly in response to the trigger signal —604

Delete data in the electronic assembly —606

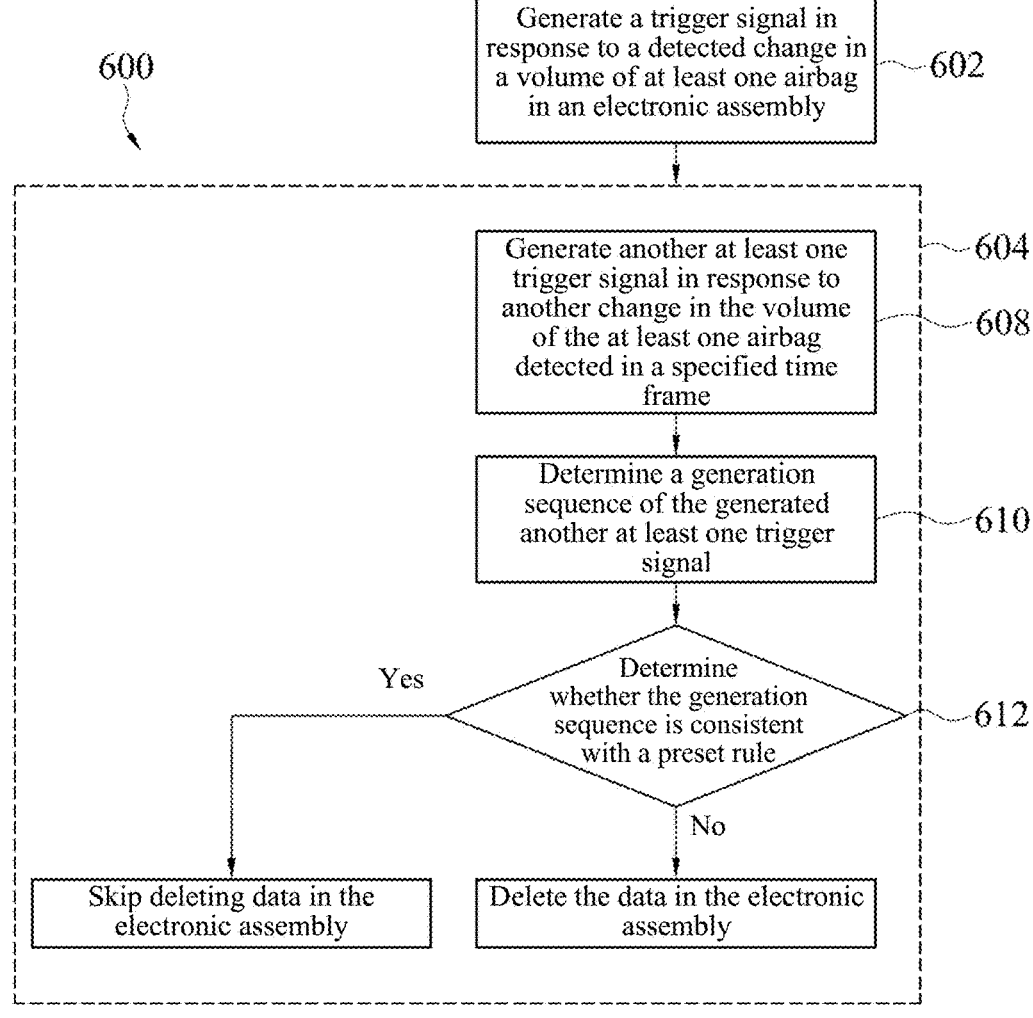

Generate a trigger signal in response to a detected change in a volume of at least one airbag in an electronic assembly —602

Generate another at least one trigger signal in response to another change in the volume of the at least one airbag detected in a specified time frame —604 —608

Determine a generation sequence of the generated another at least one trigger signal —610

Determine whether the generation sequence is consistent with a preset rule —612

Yes

No

Skip deleting data in the electronic assembly

Delete the data in the electronic assembly

FIG. 7

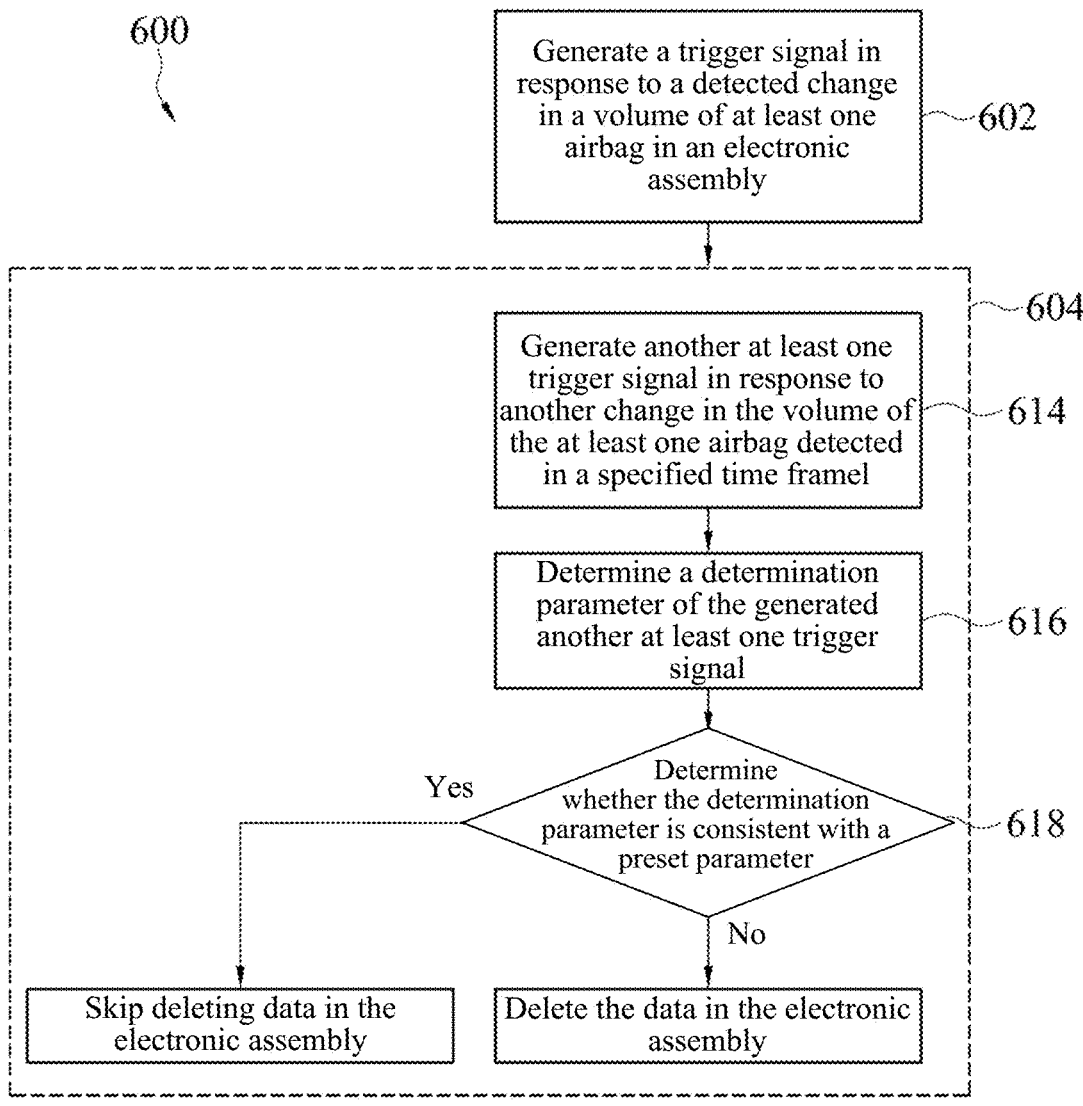

600

Generate a trigger signal in response to a detected change in a volume of at least one airbag in an electronic assembly ~602

604

Generate another at least one trigger signal in response to another change in the volume of the at least one airbag detected in a specified time framel ~614

Determine a determination parameter of the generated another at least one trigger signal ~616

Determine whether the determination parameter is consistent with a preset parameter ~618

Yes

No

Skip deleting data in the electronic assembly

Delete the data in the electronic assembly

ELECTRONIC ASSEMBLY WITH THEFT PREVENTION MECHANISM AND DATA THEFT PREVENTION METHOD FOR ELECTRONIC ASSEMBLY

CROSS-REFERENCE TO RELATED APPLICATIONS

This application claims the priority and benefit of Taiwan Patent Application No. 113103007, filed on Jan. 25, 2024, now Taiwan Patent No. I887980B issued on Jun. 21, 2025, the disclosure of which is hereby incorporated in its entirety by reference herein.

BACKGROUND

Technical Field

The present disclosure relates to an electronic assembly with a theft prevention mechanism and a data theft prevention method for an electronic assembly, and in particular, to an electronic assembly with a theft prevention mechanism and a data theft prevention method for an electronic assembly enabling unlocking of a data protecting procedure by controlling a change in a volume of an airbag.

Related Art

As intelligent vehicles develop, on-board computer (hereinafter referred to as a vehicle computer) can record real-time vehicle information, and control vehicle operations through the vehicle computer. During use, the vehicle computer is connected to the vehicle. When data in the vehicle computer needs to be updated or the vehicle computer needs to be repaired, the vehicle computer must be removed from the vehicle. However, an unauthorized individual may steal or modify data stored in the vehicle computer after obtaining it. Therefore, a protecting mechanism for the vehicle computer is necessary.

SUMMARY

The present disclosure provides an electronic assembly with a theft prevention mechanism and a data theft prevention method for an electronic assembly. When the electronic assembly with a theft prevention mechanism is subjected to external destruction, the electronic assembly can automatically execute a data protecting procedure to delete data, thereby preventing data theft.

According to some embodiments of the present disclosure, an electronic assembly with a theft prevention mechanism is provided. The electronic assembly with a theft prevention mechanism includes a housing, a circuit board assembly, at least one trigger element, and an airbag assembly. The housing has a plurality of inner walls. The circuit board assembly is disposed on one of the inner walls of the housing. The at least one trigger element is disposed on one of the inner walls of the housing. The airbag assembly is disposed within the housing and includes at least one airbag. In a normal operating state, the at least one airbag presses against the at least one trigger element.

According to some embodiments of the present disclosure, an electronic assembly with a theft prevention mechanism is provided. The electronic assembly with a theft prevention mechanism includes a housing, a circuit board assembly, a limiting assembly, at least one airbag, and at least one trigger element. The circuit board assembly is disposed within the housing. The limiting assembly is disposed within the housing and partitions a chamber within the housing. The chamber is smaller than the housing and is in fluid communication with an interior of the housing. The at least one airbag is disposed within the chamber. The at least one trigger element is disposed within the chamber, electrically connected to the circuit board assembly, and configured to detect a change of in a volume of the at least one airbag.

According to some embodiments of the present disclosure, a data theft prevention method for an electronic assembly is provided, including the following steps: generating a trigger signal in response to a detected change in a volume of at least one airbag in the electronic assembly; and executing a data protecting procedure of the electronic assembly in response to the trigger signal.

In conclusion, in some embodiments, the electronic assembly with a theft prevention mechanism or the data theft prevention method for an electronic assembly is capable of executing a data protecting procedure based on a status of an airbag-actuated trigger element. In some embodiments, it further utilizes detection of volume change in a single or multiple airbag bodies by the trigger element as a basis for disabling the data protecting procedure.

BRIEF DESCRIPTION OF THE DRAWINGS

FIGS. 6, 7, 8, and 9 are flowcharts of a data theft prevention method for an electronic assembly according to some embodiments of the present disclosure.

DETAILED DESCRIPTION

Figure 1:
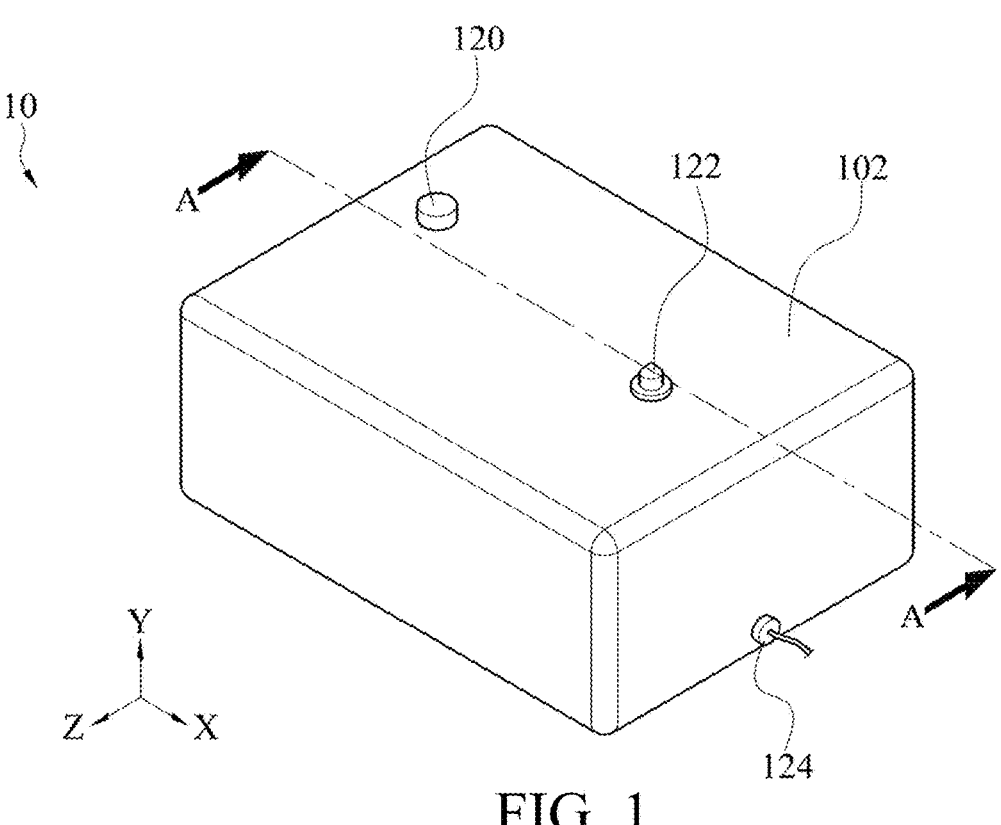
FIG. 1 is a schematic diagram of an electronic assembly with a theft prevention mechanism according to an embodiment of the present disclosure.
Figure 2:
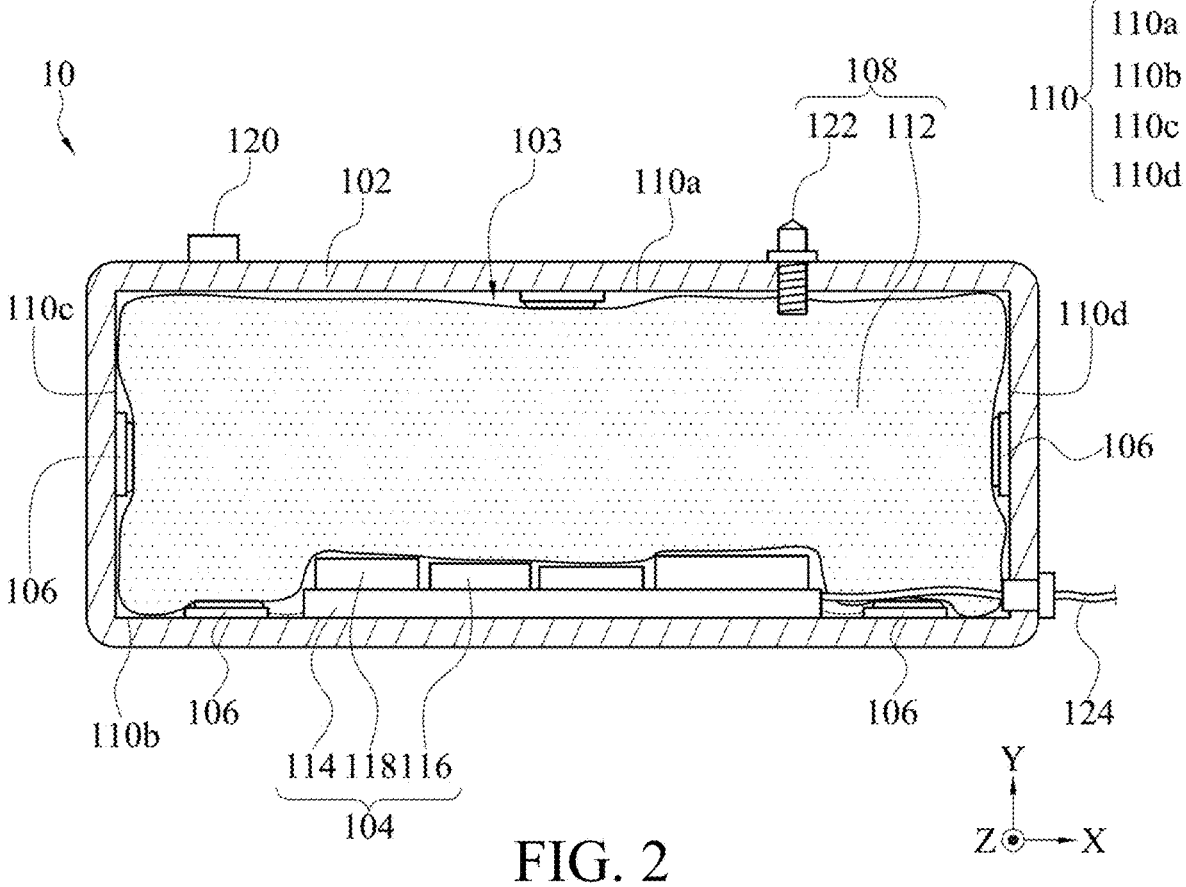
FIG. 2 is a cross-sectional view of the electronic assembly with a theft prevention mechanism in FIG. 1 in a direction A-A.

Refer to FIG. 1 and FIG. 2 together. In some embodiments, an electronic assembly 10 includes a housing 102, a circuit board assembly 104, at least one trigger element 106, and an airbag assembly 108. The housing 102 has a plurality of inner walls 110. The circuit board assembly 104 is disposed on one of the inner walls 110 of the housing 102. The at least one trigger element 106 is disposed within the housing 102 and fixed to one of the inner wall 110 of the housing 102. The airbag assembly 108 is disposed within the housing 102. Herein, the airbag assembly 108 includes at least one airbag 112. In a normal operating state, the at least one airbag 112 presses against the at least one trigger element 106. The term "normal operating state" refers to the normal operating state of the electronic assembly 10 after assembly, that is, a state that does not include a maintenance state.

The housing 102 has an accommodation space 103 configured to accommodate the circuit board assembly 104, the at least one trigger element 106, and the airbag assembly 108. A theft prevention mechanism including the housing 102, the at least one trigger element 106, and the airbag assembly 108 can protect data stored in the circuit board assembly 104 from being maliciously stolen. In some embodiments, in a normal operating state, the accommodation space 103 may be a sealed space. In other words, when the housing 102 is in the normal operating state, the circuit board assembly 104 is not exposed from the housing 102. When the circuit board assembly 104 needs to be repaired, a user needs to cancel protection (that is, a data protecting procedure described below) of the electronic assembly 10, to remove the circuit board assembly 104 from the housing 102 for repair. In this case, the data stored in the circuit board assembly 104 can be read.

The at least one trigger element 106 is fixed to the inner wall 110 of the housing 102, and an arrangement position thereof is determined based on arrangements of the circuit board assembly 104 and the airbag 112. E.g., the at least one trigger element 106 may be fixed around the circuit board assembly 104 at a position on the inner wall 110 at which the at least one trigger element 106 can be triggered by the airbag 112. In this way, in the normal operating state, the airbag 112 can always trigger the at least one trigger element 106 on the inner wall 110. In some embodiments, the at least one trigger element 106 may be fixed to the inner wall 110 through an adhesive, a screw, welding, structural fixation, or the like. Any connection means that enables the at least one trigger element 106 to be fixed to the inner wall 110 may be implemented. The present disclosure is not limited to the above connection means.

The airbag 112 can have an inflated state and a deflated state based on an amount of gas stored therein. In addition, when the airbag 112 is broken by an external force, the airbag 112 presents a collapsed state in response to leakage of the gas. Herein, the airbag 112 is in the inflated state (that is, the airbag 112 is filled with gas) in the normal operating state, to press against at least one trigger element 106 and be attached to the circuit board assembly 104 and the housing 102. In this way, even if an exterior (another side of the inner wall 110) of the housing 102 is destroyed, since the airbag 112 is attached to the housing 102 and the circuit board assembly 104, a destroyer further needs to destroy the airbag 112 to remove the circuit board assembly 104.

In some embodiments, the airbag 112 may be made of an elastic soft material (e.g., a nylon material), so that when the airbag 112 is attached to the circuit board assembly 104, neither the circuit board assembly 104 is damaged as a result of being compressed by the airbag 112, nor the airbag 112 suffers gas leakage as a result of being punctured by the circuit board assembly 104. In some embodiments, the airbag assembly 108 may include one or more airbags 112.

The circuit board assembly 104 may determine whether the housing 102 is maliciously destroyed by detecting whether the airbag 112 still presses against the at least one trigger element 106. When the exterior of the housing 102 is destroyed (e.g., the housing 102 is destroyed by an unauthorized individual by using an electric drill), the airbag 112 is also destroyed together with the housing 102. Specifically, after the airbag 112 is destroyed (e.g., the electric drill makes a hole on a surface of the airbag 112), the airbag 112 changes from the inflated state to the collapsed state. In this case, the function of pressing against the trigger element 106 is removed. When the airbag 112 no longer presses against any trigger element 106 for a period of time, the circuit board assembly 104 can detect a trigger event of the at least one trigger element 106, and determine that electronic assembly 10 is being maliciously destroyed. E.g., when any trigger element 106 changes from a pressed state to a non-pressed state, the circuit board assembly 104 receives a trigger signal from the at least one trigger element 106. To be specific, the circuit board assembly 104 can determine a current state of the airbag 112 by detecting whether receiving the trigger signal from the at least one trigger element 106, thereby determining whether the housing 102 is maliciously destroyed.

In some embodiments, the inner wall 110 may include the inner walls 110 of the housing 102 in different directions, and at least one inner wall 110 is provided with at least one trigger element 106. As shown in FIG. 2, for ease of description, when the housing 102 is a rectangular housing, the inner wall 110 can define a top wall 110a, a bottom wall 110b, a left wall 110c, a right wall 110d, a front wall, and a rear wall in different directions. As shown in FIG. 2, the top wall 110a and the bottom wall 110b may be two inner walls 110 opposite to each other in a Y axis direction. The left wall 110c and the right wall 110d may be two inner walls 110 opposite to each other in an X axis direction. The front wall and the rear wall may be two inner walls 110 opposite to each other in a Z axis direction. In other words, the housing 102 is a hollow hexahedron formed by connecting edges of the top wall 110a, the bottom wall 110b, the left wall 110c, the right wall 110d, the front wall, and the rear wall. In some embodiments, the top wall 110a, the left wall 110c, the right wall 110d, the rear wall, and the front wall each may be provided with one trigger element 106. In this way, when the inner wall 110 in any direction of the housing 102 and the airbag 112 are simultaneously destroyed, at least one trigger element 106 adjacent to a destroyed position of the airbag 112 can be quickly triggered after the airbag 112 separates from at least one trigger element 106.

In some embodiments, the circuit board assembly 104 is disposed on one of the sides of the inner walls 110, and the at least one trigger element 106 is disposed on the same inner wall 110 as the circuit board assembly 104. This at least one trigger element 106 includes a plurality of trigger elements which are respectively provided on each of opposite sides of the circuit board assembly 104. E.g., as shown in FIG. 2, the circuit board assembly 104 is disposed on the bottom wall 110b, and two sides of the circuit board assembly 104 each are provided with one trigger element 106. When the airbag 112 is in the inflated state, a soft characteristic of the airbag 112 enables the airbag to cover a surface of the circuit board assembly 104 and extend to the bottom wall 110b, and press against the at least one trigger elements 106 disposed on the two sides of the circuit board assembly 104. In this way, it is ensured that the at least one trigger element 106 will indeed be triggered when the circuit board assembly 104 is exposed from the airbag 112.

In some embodiments, the circuit board assembly 104 includes a substrate 114, a storage module 116, and a processing module 118. The substrate 114 is disposed on the inner wall 102 of the housing 110. The storage module 116 is disposed on the substrate 114 and configured to store data. The processing module 118 is disposed on the substrate 114 and electrically connected to the storage module 116 and at least one trigger element 106. The processing module 118 is configured to execute a data protecting procedure of the data in response to any trigger element 106 being actuated. In other words, during implementation, the processing module 118 detects a status of the at least one trigger element 106 and selectively executes the data protecting procedure of the data based on a detection result.

In some embodiments, the substrate 114 may be directly or indirectly fixed to the inner wall 110. E.g., the substrate 114 may be fixed to the inner wall 110 through a screw or a fastener (as shown in FIG. 2). In this way, it is ensured that when the electronic assembly 10 is applied to a mobile vehicle, the circuit board assembly 104 remains fixed to the housing 102 even during the movement of the mobile vehicle, thereby avoiding accidental trigger of the at least one trigger element 106.

In some embodiments, the processing module 118 establishes an electrical connection with one or more trigger element 106, enable it to receive a real-time trigger signal when any of the trigger elements 106 is actuated. Moreover, the processing module 118 can selectively execute the data protecting procedure based on the trigger signal. In some embodiments, the activation of the at least one trigger element 106 to transmit the trigger signal may refer to the generation of the trigger signal by at least one trigger element 106 when it changes state from being pressed by the airbag 112 to being released. In some embodiments, the activation of at least one trigger element 106 to transmit the trigger signal may indicate that the trigger element 106 outputs a signal at a different level when it is not pressed compared to the level of a signal generated when at least one trigger element is pressed.

In some embodiments, executing the data protecting procedure may mean that the processing module 118 directly deletes the data within the storage module 116 when receiving the trigger signal. In other words, when receiving a trigger signal from any trigger element 106, the electronic assembly 10 can forcibly clear the data within the storage module 116 to prevent the data within the storage module 116 from being stolen.

In some embodiments, executing the data protecting procedure may mean that the processing module 118 selectively deletes the data within the storage module 116 based on a determination parameter of another trigger signal received in a specified time frame.

In some embodiments, the determination parameter may refer to a total number of trigger signals from the at least one trigger element 106. E.g., within a specified time frame, each trigger element 106 detects volume changes in the airbag 112 and generates trigger signals to the processing module 118. The processing module 118 then counts the total number of trigger signals received from trigger element 106 and determines whether the total number is consistent with a preset parameter. E.g., if the trigger element 106 generates seven trigger signals within the specified time frame (that is, the trigger element 106 has been pressed by the airbag 112 seven times), the total number of trigger signals is seven. If the total number of trigger signals is consistent with a preset parameter, the processing module 118 does not delete the data within the storage module 116. However, if the total number of trigger signals is inconsistent with the preset parameter, the processing module 118 forcibly clears the data within the storage module 116.

In some embodiments, the determination parameter may also refer to a number of cycles during which the airbag 112 changes from a completely inflated state to a completely deflated state or from a completely deflated state to a completely inflated state. This means that all of the at least one trigger elements 106 generate a trigger signal repeatedly, which is hereinafter referred to as a "number of cycles". In other words, within a specified time frame, a user needs to deflate the airbag 112 to separate it from all of the at least one trigger elements 106, then inflate the airbag to press against all of the at least one trigger elements 106, and repeat the inflation and deflation cycle for a preset number of times (the "number of cycles"). During the specified time frame, the processing module 118 detects another trigger signal from the at least one trigger elements 106, counts the number of cycles in response to the detected trigger signals, and determines whether the number of cycles is consistent with the preset parameter. If the number of cycles is consistent with the preset parameter, the processing module 118 does not delete the data within the storage module 116. However, if the number of cycles is inconsistent with the preset parameter, the processing module 118 forcibly clears the data within the storage module 116.

In some embodiments, the circuit board assembly 104 may be coupled to the at least one trigger element 106 through a signal line (not shown in the figure), to receive the determination parameter (the determination parameter may be, e.g., a pressure parameter or a distance parameter) of the trigger signal generated by the at least one trigger element 106. The signal line may be disposed along the inner wall 110 of the housing 102, to avoid an open circuit as a result of squeeze of the signal line by the airbag 112 in the inflated state. In some embodiments, the trigger element 106 can transmit the trigger signal to the circuit board assembly 104 in a wireless transmission manner (e.g., Bluetooth, 2.4G, or a wireless fidelity technology).

In another embodiment, the electronic assembly 10 has a plurality of trigger elements 106, and the determination parameter may be a sequence in which the trigger elements 106 generate a trigger signal (which is referred to as a generation sequence). If the generation sequence is consistent with the preset parameter (that is, a preset generation sequence), the processing module 118 does not delete the data within the storage module 116. If the generation sequence is inconsistent with the preset parameter, the processing module 118 forcibly clears the data within the storage module 116.

In some embodiments, the electronic assembly 10 further includes a warning assembly 120. The warning assembly 120 is electrically connected to the processing module 118, and is configured to generate a warning signal in response to an execution result of the data protecting procedure. Specifically, when the housing 102 and the airbag 112 are destroyed, the warning signal is generated after the processing module 118 executes the data protecting procedure in response to the at least one trigger element 106 being actuated. In addition, the warning signal may be transmitted through the warning assembly 120. Alternatively, when the data protecting procedure is canceled, the warning assembly 120 may transmit a warning signal to prompt that the data protecting procedure is canceled.

In some embodiments, as shown in FIG. 2, the warning assembly 120 is positioned on an external wall of the housing 102. The electronic assembly 10 is configured to issue a warning via warning assembly 120 to any unauthorized individual who engages in malicious activity with respect to the electronic assembly 10. Furthermore, the warning assembly 120 may serve to notify whether the electronic assembly 10 is executing the data protecting procedure.

In some embodiments, the warning assembly 120 may be a buzzer, wherein the buzzer can emit a warning sound based on the warning signal. In some embodiments, the warning assembly 120 may be an indicator light set, wherein the indicator light set can emit warning light based on the warning signal. In some embodiments, the warning assembly 120 may be a display, wherein the display can display a prompt text or a prompt symbol based on the warning signal.

In some embodiments, the processing module 118 can deter the unauthorized individual by adjusting the warning sound of the buzzer (e.g., adjusting the warning sound to a sharp alarm sound) or adjusting the warning light of the indicator light set (e.g., adjusting the warning light to flashing light).

As shown in FIG. 2, in some embodiments, referring to FIG. 1 and FIG. 2, the airbag assembly 108 further includes at least one inflation valve 122. The at least one inflation valve 122 is embedded in the housing 102 and individually connected to respective airbags 112. In some embodiments, the inflation valve 122 may be a one-way inflation valve or a two-way inflation valve. For instance, in the case of the one-way valve, gas may be introduced into the airbag 112 through the one-way valve and prevents the gas from flowing back out, so that the airbag 112 can maintain in the inflated state. Alternatively, in the case of the two-way valve, gas may be introduced into the airbag 112 through the two-way valve. Without gas inflow, the gas inside the airbag 112 can be allowed to flow back out through the two-way valve, permitting the airbag 112 to transition from the inflated state to the deflated state.

As shown in FIG. 2, in some embodiments, the electronic assembly 10 further includes a connection line 124. The connection line 124 is passed through the housing 102. One end of the connection line 124 is electrically connected to the circuit board assembly 104, and the other end of the connection line 124 is located outside the housing 102. In some embodiments, the other end of the connection line 124 may be coupled to a power source (not shown, e.g., a power supply unit) outside the housing 102, to provide power for operation of the circuit board assembly 104. In some embodiments, the other end of the connection line 124 may be coupled to other devices (not shown, e.g., an electronic device and/or a vehicle electronic system), to control operation of the other devices. In some embodiments, the connection line 124 is tightly fitted in the housing 102, so that the housing 102 can remain sealed. In some embodiments, the processing module 118 can start executing the data protecting procedure through a backup battery module on the circuit board assembly 104 after the connection line 124 is disconnected from the power supply.

Figure 3:
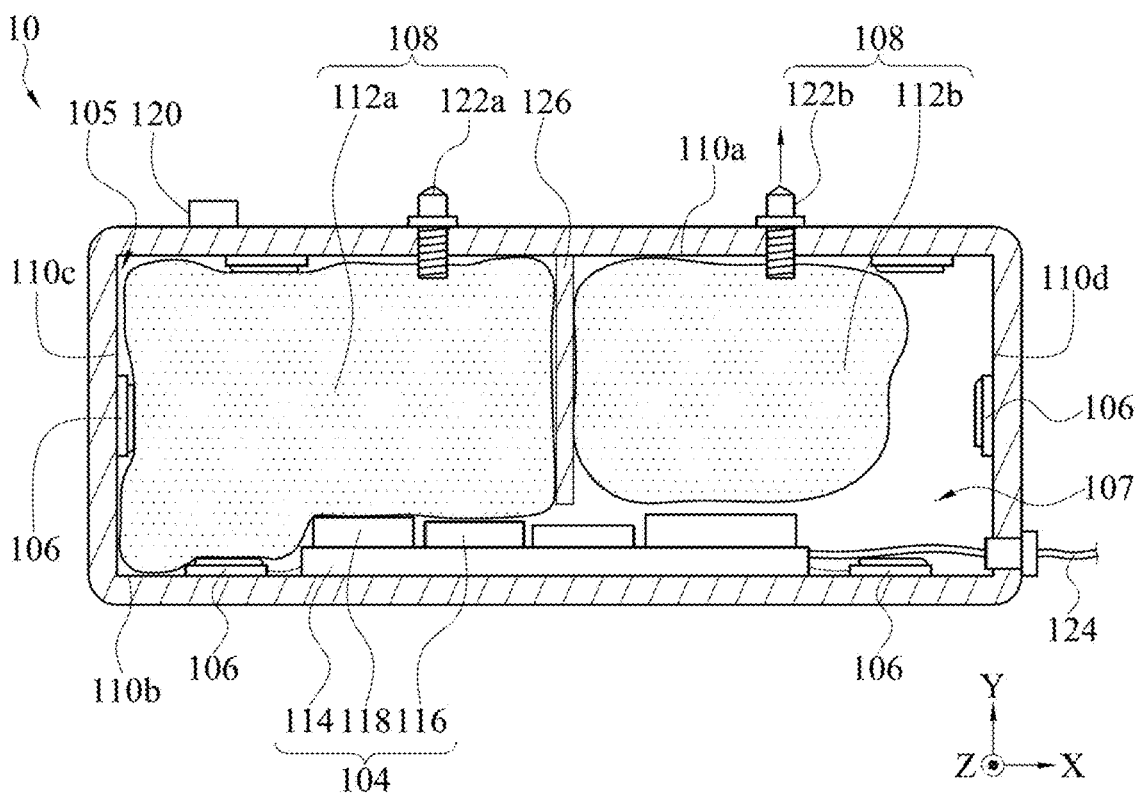
FIG. 3 is a cross-sectional view (I) of an electronic assembly with a theft prevention mechanism according to some embodiments of the present disclosure.

Refer to FIG. 3. In some embodiments, the airbag assembly 108 includes two airbags 112, as shown in FIG. 3.

In some embodiments, as shown in FIG. 3, a positioning plate 126 may be disposed within the housing 102. The positioning plate 126 is fixed to the inner wall 110 of the housing 102, and the two airbags (112a, 112b) are respectively located on two sides of the positioning plate 126.

In some embodiments, the positioning plate 126 may be aligned with the circuit board assembly 104, to ensure that the airbags (112a, 112b) located on both sides of the positioning plate 126 can be contact with the circuit board assembly 104 in the inflated state. E.g., when the circuit board assembly 104 is fixed to the bottom wall 110b, the positioning plate 126 may be fixed to one of the top wall 110a, the front wall, and the rear wall, or fixed to more than two of the aforementioned inner walls 110, and extend from one side of the top wall 110a toward the bottom wall 110b (as shown in FIG. 3). When the circuit board assembly 104 is fixed to the left wall 110c or the right wall 110d, the positioning plate 126 may be fixed to the rear wall and/or the front wall, and extend toward an opposite side.

As shown in FIG. 3, in some embodiments, the housing 102 partitions the accommodation space 103 into two subspaces 105,107 for separately accommodating the two airbags (112a,112b) via the positioning plate 126, thereby separating the two airbags (112a,112b) to prevent interference with each other (e.g., squeezing each other). In some embodiments, the housing 102 may allocate its accommodation space 103 into a first sub-space 105 and a second sub-space 107 by means of the positioning plate 126. The volumes of the first sub-space 105 and the second sub-space 107 may be the same or different. Herein, the volume of each sub-space 105/107 may be determined based on a volume of the corresponding inflated airbag 112a/112b accommodated therein.

In some embodiments, the circuit board assembly 104 may be located in either the first sub-space 105 or the second sub-space 107, or may be a portion located in the first sub-space 105 and another portion located in the second sub-space 107.

As shown in FIG. 3, in some embodiments, the trigger elements 106 are distributed on and fixed to the inner walls 110 of the first sub-space 105 and the second sub-space 107. Herein, during the normal operating state, the two airbags (112a and 112b) are simultaneously in the inflated state, and each the airbag 112a or the airbag 112b presses against the respective trigger elements 106 located in a same sub-space (the first sub-space 105 or the second sub-space 107). In some embodiments, in addition to being arranged on the inner walls 110 in various directions of the housing 102, some of the trigger elements 106 may be fixed to the two side surfaces of the positioning plate 126.

In some embodiments, the number of inflation valve 122 may be increased based on the number of the airbags 112. Herein, each airbag 112 is provided with one inflation valve 122 for a user to inflate and deflate the respective airbag 112. As shown in FIG. 3, the airbag assembly 108 further includes two inflation valves 122a and 122b. The inflation valves 122a, 122b are respectively embedded in the housing 102. The inflation valve 122a is connected to the airbag 112a, and the inflation valve 122b is connected to the airbag 112b. Gas may be respectively introduced into the connected airbags (112a, 112b) through the two inflation valves 122a, 122b.

In some embodiments, the processing module 118 can determine whether to delete the stored data based on a generation sequence of trigger signals produced by the two airbags (112a,112b) actuating the trigger elements 106, to execute the data protecting procedure. E.g., when the processing module 118 starts timing of the specified time frame, the user may inflate or deflate the corresponding airbag 112a or 112b in a specific sequence through the corresponding inflation valve 122a or 122b, so that the trigger elements 106 respectively pressed by the two airbags (112a and 112b) generate trigger signals to the processing module 118 in a sequence consistent with the generation sequence. In some embodiments, the user may use a combination of a generation sequence and a number of inflation/deflation times, so that the trigger elements 106 respectively pressed by the two airbags (112a and 112b) generate trigger signals to the processing module 118 in a sequence consistent with the generation sequence, thereby executing the data protecting procedure. E.g., an operation sequence is: inflate/deflate the airbag 112a twice, inflate/deflate the airbag 112b once, inflate/deflate the airbag 112a three times, and inflate/deflate airbag 112b twice.

Figure 4A:
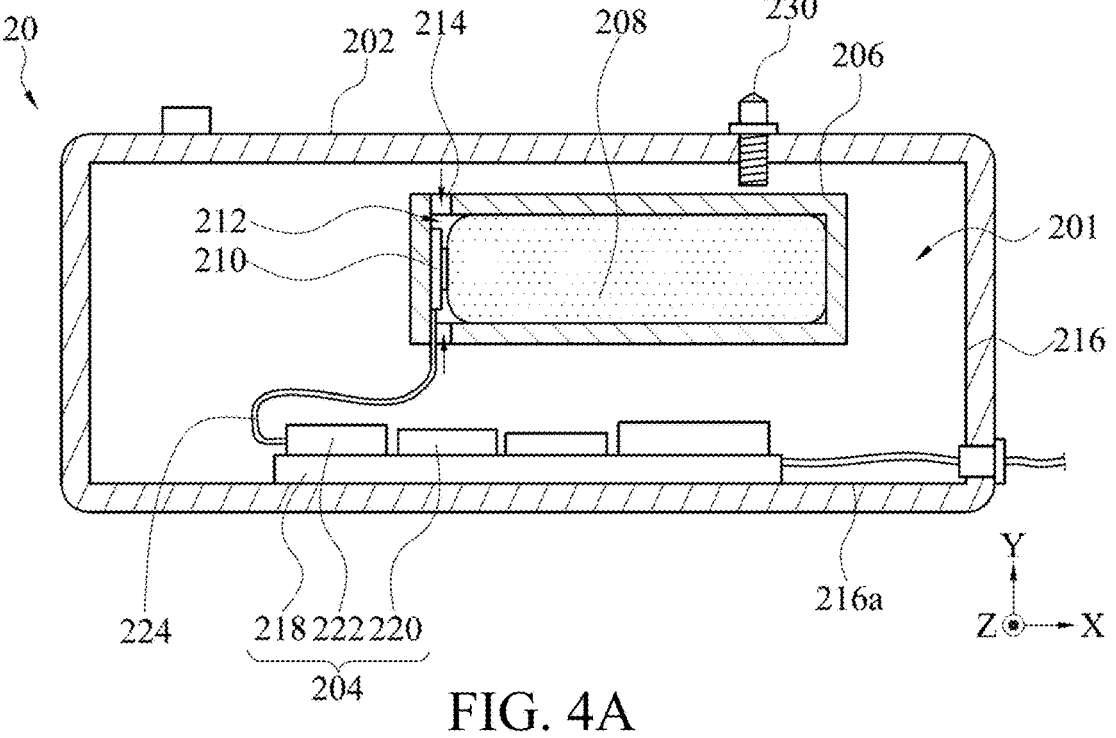
FIG. 4A is a cross-sectional view (II) of an electronic assembly with a theft prevention mechanism according to some embodiments of the present disclosure.
Figures 4B, 5:
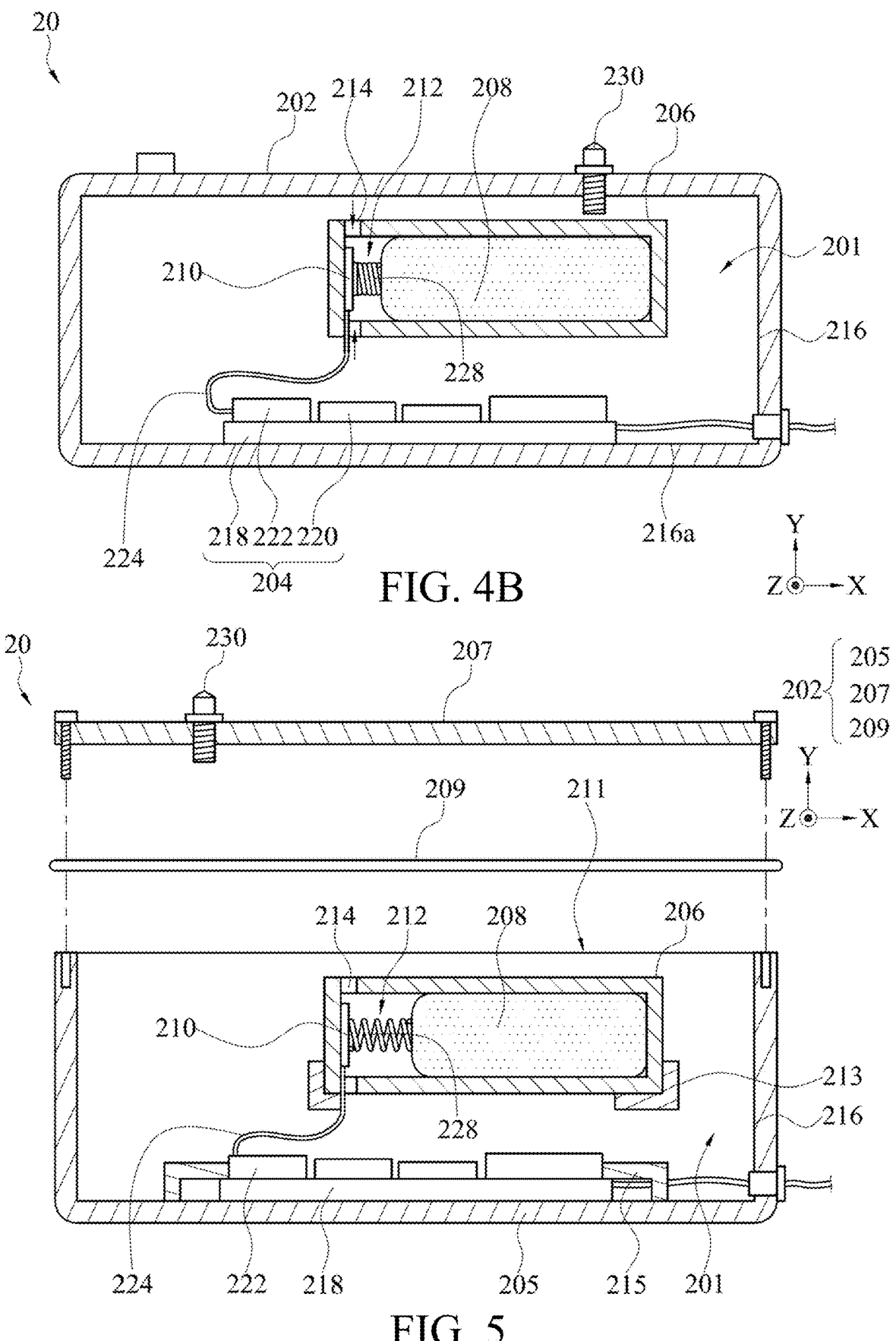
FIG. 4B is a cross-sectional view (III) of an electronic assembly with a theft prevention mechanism according to some embodiments of the present disclosure.
FIG. 5 is a cross-sectional view (IV) of an electronic assembly with a theft prevention mechanism according to some embodiments of the present disclosure.

Refer to FIG. 4A, FIG. 4B, and FIG. 5. In some embodiments, a combination of the trigger element 106 and the airbag assembly 108 may be replaced by a combination of a single airbag 208 and a trigger element 210.

As shown in FIG. 4A, FIG. 4B, and FIG. 5, the electronic assembly 20 includes a housing 202, a circuit board assembly 204, a limiting assembly 206, at least one airbag 208, and a trigger element 210. The circuit board assembly 204 is disposed within the housing 202. The limiting assembly 206 is disposed within the housing 202. Herein, the limiting assembly 206 partitions a chamber 212 within the housing 202. The chamber 212 is smaller than the housing 202 and is in fluid communication with an interior of the housing. In other words, an internal space of the chamber 212 is smaller than an accommodation space 201 of the housing 202.

The airbag 208 is disposed within the chamber 212. The trigger element 210 is disposed within the chamber 212, electrically connected to a processing module 222 of the circuit board assembly 204 through a signal line 224, and configured to detect a change in the volume of the airbag 208, so that the circuit board assembly 204 receives, through the signal line 224, a trigger signal with a determination parameter (the determination parameter may be, e.g., a pressure parameter or a distance parameter) generated by the trigger element 210. In some embodiments, the trigger element 210 can transmit the trigger signal to the circuit board assembly 204 in a wireless transmission manner.

In some embodiments, the limiting assembly 206 may be a container having the chamber 212 and fixed to an inner wall 216 of the housing 202. In some embodiments, the limiting assembly 206 may be a plurality of partitions, and the partitions together with at least one inner wall 216 of the housing 202 partition off a small space (that is, the chamber 212) from the accommodation space 201 of the housing 202.

Herein, the chamber 212 may be configured to limit a direction of volume change of the airbag 208 in the inflated state, so that the trigger element 210 can detect the volume change of the airbag 208.

The housing 202 may be an airtight housing. In other words, the accommodation space 201 of the housing 202 is an airtight space. Gas with a preset air pressure is pre-stored in the airbag 208. Therefore, the airbag 208 generates a volume change (the airbag changes to the inflated state or the deflated state) in response to a change in the difference between its internal air pressure and external air pressure (e.g., an air pressure of the chamber 212). In some embodiments, in a normal operating state, the internal air pressure of the airbag 208 is greater than or equal to the external air pressure of the airbag 208, and the external air pressure of the airbag 208 is less than a standard atmospheric pressure. Since an ambient air pressure outside the housing 202 is the standard atmospheric pressure, the external air pressure of the airbag 208 (that is, the internal air pressure of the accommodation space 201 of the housing 202) rises when the housing 202 is destroyed. The increase of the external pressure causes the internal air pressure of the airbag 208 to rise, so that a volume of the airbag 208 decreases. In some embodiments, in a normal operating state, the internal air pressure of the airbag 208 is equal to the external air pressure of the airbag 208, and the external air pressure of the airbag 208 is greater than the standard atmospheric pressure. Since an ambient air pressure outside the housing 202 is the standard atmospheric pressure, the external air pressure of the airbag 208 (that is, the air pressure in the accommodation space 201 of the housing 202) drops when the housing 202 is destroyed. The decrease of the external pressure causes the internal air pressure of the airbag 208 to drop, so that the volume of the airbag 208 increases.

When the volume of the airbag 208 changes, the trigger element 210 generates a corresponding trigger signal with a determination parameter.

In some embodiments, the chamber 212 is in fluid communication with the interior of the housing may mean that the limiting assembly 206 has at least one hole 214, so that inside of the chamber 212 is in fluid communication with the accommodation space 201 outside the chamber 212 through the hole 214. In this way, the volume of the airbag 208 changes in response to a change in the air pressure of the accommodation space 201.

In some embodiments, the circuit board assembly 204 and the limiting assembly 206 are located in the housing 202 and fixed to a plurality of inner walls 216 of the housing 202. The circuit board assembly 204 and the limiting assembly 206 may be fixed to different inner walls 216. E.g., as shown in FIG. 4A, FIG. 4B, and FIG. 5, the circuit board assembly 204 is fixed to a bottom wall 216a of the inner walls 216, and the limiting assembly 206 is fixed to one of a front wall or a rear wall of the inner walls 216. In some embodiments, the circuit board assembly 204 and the limiting assembly 206 may be fixed to a same inner wall 216.

In some embodiments, the circuit board assembly 204 includes a substrate 218, a storage module 220, and a processing module 222. The substrate 218 is disposed within the housing 202 (e.g., the substrate 218 is fixed to the inner wall 216 in the housing 202). The storage module 220 is located on the substrate 218 and configured to store data. The processing module 222 is disposed on the substrate 218 and electrically connected to the storage module 220 and the trigger element 210. The processing module 222 is configured to execute a data protecting procedure of the data based on a detection result of the trigger element 210.

As shown in FIG. 4A, in some embodiments, the airbag 208 presses against the trigger element 210 in a normal operating state. When the volume of the airbag 208 changes in response to a change in an external air pressure, the trigger element 210 generates a corresponding trigger signal based on the change in the volume of the airbag 208. In the normal operating state, the fact that the airbag 208 presses against the trigger element 210 refers to the airbag 208 being in the inflated state and pressing against the trigger element 210.

In some embodiments, the trigger element 210 may be a pressure sensor or a force sensor. The generated trigger signal may represent a pressure parameter between the trigger element 210 and the airbag 208. In some embodiments, the trigger element 210 may be a ranging sensor (e.g., a light sensor or an ultrasonic sensor). The generated trigger signal may represent a distance parameter between the trigger element 210 and the airbag 208.

In some embodiments, as shown in FIG. 4A, the trigger element 210 may be a non-contact sensor such as a pressure sensor or a ranging sensor, and the trigger element 210 may be coupled to the processing module 222 of the circuit board assembly 204 through the signal line 224, or may transmit the trigger signal in a wireless transmission manner. Herein, in some embodiments, the trigger element 210 is a pressure sensor, and the trigger signal includes a pressure parameter. In some embodiments, the trigger element 210 is a ranging sensor, and the trigger signal includes a distance parameter. The processing module 222 determines whether to execute the data protecting procedure (which is described later) based on the pressure parameter (or the distance parameter).

In some embodiments, in a normal operating state, the internal air pressure of the airbag 208 is greater than or equal to an external air pressure of the airbag 208, and the external air pressure of the airbag 208 is less than a standard atmospheric pressure. When the external air pressure of the airbag 208 changes, the volume of the airbag 208 decreases due to the increase of the external air pressure of the airbag 208. E.g., air pressures of the accommodation space 201, the chamber 212, and the airbag 208 are 0.5 times the standard atmospheric pressure (which are negative pressures). The trigger element 210 may generate a first pressure parameter based on the change in the volume of the airbag 208. When the housing 202 is destroyed, the air pressures of the accommodation space 201 and the chamber 212 rise to the standard atmospheric pressure. At this moment, the volume of the airbag 208 with the negative pressure decreases. The trigger element 210 may generate a second pressure parameter in response to a detected change in the volume of the airbag 208. The first pressure parameter is greater than the second pressure parameter. Therefore, the processing module 222 can determine that the housing 202 is destroyed in response to the first pressure parameter being greater than the second pressure parameter, and therefore execute the data protecting procedure. It should be particularly noted that the first and the second pressure parameter may represent one or more values from a sequence of pressure parameters or multiple parameters.

In some embodiments, in a normal operating state, the internal air pressure in the airbag 208 is equal to the external air pressure of the airbag 208, and the external air pressure of the airbag 208 is greater than the standard atmospheric pressure. When the external air pressure of the airbag 208 changes, the volume of the airbag 208 increases with a decrease of the external air pressure of the airbag 208. E.g., air pressures of the accommodation space 201, the chamber 212, and the airbag 208 are 2 times the standard atmospheric pressure (which are positive pressures). The trigger element 210 may generate a first pressure parameter based on the change in the volume of the airbag 208. When the housing 202 is destroyed, the air pressures of the accommodation space 201 and the chamber 212 drop to the standard atmospheric pressure. At this moment, the volume of the airbag 208 with the positive pressure increases. The trigger element 210 may generate a second pressure parameter in response to the detected change in the volume of the airbag 208. The first pressure parameter is less than the second pressure parameter. Therefore, the processing module 222 can determine that the housing 202 is destroyed in response to the first pressure parameter being less than the second pressure parameter, and therefore execute the data protecting procedure, to delete the data within the storage module 220.

As shown in FIG. 4B, in some embodiments, in the normal operating state, the airbag 208 does not touch the trigger element 210, and an elastic element 228 exists between the trigger element 210 and the airbag 208. The elastic element 228 may be connected to the trigger element 210 and the airbag 208. In some embodiments, there may be multiple elastic elements 228. At least one of these elastic elements 228 is connected to the airbag 208, allowing changes in the volume of the airbag 208, therefore the elastic element(s) 228 is driven. When the airbag 208 is in the inflated state, the elastic element 228 presses against the trigger element 210, as a result, a trigger signal is not generated. When the airbag 208 contracts, it drives the at least one elastic element 228 away from the trigger element 210, as a result, a trigger signal is generated.

The elastic element 228 stretches or retracts with the change in the volume of the airbag 208, so that the trigger element 210 can detect the pressure parameter generated in response to the change in the volume of the airbag 208. Based on the change in the volume of the airbag 208, the elastic element 228 may move toward the trigger element 210 (at this moment, the trigger element 210 receives thrust from the elastic element 228, and the pressure parameter may be greater than 0) or move away from the trigger element 210 (at this moment, the trigger element 210 does not receive thrust from the elastic element 228, and the pressure parameter may be equal to 0). In some embodiments, the trigger element 210 is a force sensor. The trigger element 210 can measure an acting force of the airbag 208 in the inflated state or the deflated state. E.g., when the airbag 208 presses against the trigger element 210 (which generates a positive acting force), the trigger signal may be a pressure parameter, and when the airbag 208 moves away from the trigger element 210 (which generates a reverse acting force), the trigger signal may be a tension parameter. In some embodiments, the elastic element 228 may be a spring pin, a spring, or a spring leaf.

As shown in FIG. 4B, in some embodiments, when the volume of the airbag 208 increases so that the airbag compresses the elastic element 228, the trigger element 210 detects the first pressure parameter of the airbag 208, or when the volume of the airbag 208 decreases, the trigger element 210 detects the second pressure parameter of the airbag 208. In other words, the change in the volume of the airbag 208 drives the elastic element 228 to deform, and the elastic element 228 actuates the trigger element 210 to detect the first pressure parameter or the second pressure parameter.

In some embodiments, the electronic assembly 20 further includes at least one inflation valve 230. The inflation valve 230 is embedded in the housing 202. In some embodiments, the inflation valve 230 may be a two-way inflation valve. The two-way inflation valve is used as an example. An air pressure pump can inject gas into the accommodation space 201 through the two-way inflation valve. Alternatively, gas may be exhausted from the accommodation space 201 through the two-way inflation valve. In this way, the atmospheric pressure of the accommodation space 201 is changed. In some embodiments, a preset rule for canceling the data protecting procedure may be a combination of an air pressure change and a time. E.g., the preset rule is a sequence of: deflation for 10 seconds, inflation for 25 seconds, inflation for 20 seconds, deflation for 15 seconds, and finally deflation for 25 seconds. In this case, inflation or deflation may be performed on the accommodation space 201 for a specified time by using the air pressure pump connected to the inflation valve 230. The airbag 208 expands or contracts based on the atmospheric pressure of the accommodation space 201, so that the trigger element 210 generates a corresponding trigger signal. The processing module 222 determines whether the trigger signal transmitted by the trigger element 210 conforms to the preset rule. If the received trigger signal conforms to the preset rule, the processing module 222 does not execute the data protecting procedure. In some embodiments, the preset rule may be a combination of a pressure parameter and a time. E.g., when the trigger element 210 is a pressure sensor, the trigger element 210 can generate a corresponding pressure parameter based on an action (deflation for 10 seconds, inflation for 25 seconds, inflation for 20 seconds, deflation for 15 seconds, and deflation for 25 seconds) of the air pressure pump and the inflated state and the deflated state of the airbag 208. In this way, the processing module 222 can perform comparison on the pressure parameter transmitted by the trigger element 210, to determine whether to cancel the data protecting procedure. In some embodiments, the trigger element 210 is a ranging sensor, it detects a distance between itself and the airbag 208 to generate a distance parameter, so that the processing module 222 can perform comparison on the distance parameter transmitted by the trigger element 210, to determine whether to cancel the data protecting procedure.

Refer to FIG. 5. The housing 202 includes a base 205, a cover plate 207, and a seal ring 209. The base 205 has an opening portion 211. The seal ring 209 is located between the cover plate 207 and the opening portion 211. After the cover plate 207 is fixed to the base 205, the seal ring 209 can fill a gap between the base 205 and the cover plate 207, to form the accommodation space 201 between the base 205 and the cover plate 207. In this way, in case of no destruction on the housing 202, the housing 202 can maintain the atmospheric pressure of the accommodation space 201.

In some embodiments, as shown in FIG. 5, the housing 202 further includes at least one first fixing element 213 and at least one second fixing element 215. The first fixing element 213 is connected to the inner wall 216 of the housing 202, and the trigger element 210 may be fixed to the housing 202 by each first fixing element 213. The second fixing element 215 is connected to the inner wall 216 of the housing 202 (the first fixing element 213 and the second fixing element 215 may be connected to the same inner wall 216 or different inner walls), and the circuit board assembly 204 may be fixed to the housing 202 by each second fixing element 215. In some embodiments, the first fixing element 213 and the second fixing element 215 each may be an engagement structure, a screw fixing piece, or a stop structure extending from the inner wall 216.

Refer to FIG. 1 to FIG. 6 together. In some embodiments, a data theft prevention method 600 for an electronic assembly includes: generating a trigger signal in response to a detected change in the volume of the at least one airbag 112 in the electronic assembly 10 (step 602); and executing a data protecting procedure in the electronic assembly 10 in response to the trigger signal (step 604). It should be noted that, data may be stored within the storage module 116 of the electronic assembly 10 before the data theft prevention method 600 for an electronic assembly is executed, and may be cleared within the storage module 116 after the data protecting procedure is executed (which is detailed later).

In some embodiments, in step 602, at least one trigger element 106 is configured to detect a change in the volume of the at least one airbag 112, and generate a trigger signal when the volume of the airbag 112 changes. E.g., when the electronic assembly 10 is not destroyed, the airbag 112 is in an inflated state and presses against the at least one trigger element 106. At this moment, the at least one trigger element 106 does not generate a trigger signal, and the processing module 118 does not execute the data protecting procedure. When the housing 102 and the airbag 112 are both destroyed, gas leaks through a puncture in the airbag 112. In this case, the volume of the airbag 112 changes (at this moment, the airbag 112 is in a collapsed state), as a result, the airbag 112 is separated from at least one trigger element 106. The at least one trigger element 106 not pressed by the airbag 112 is triggered to generate a trigger signal. The processing module 118 can detect and receive the trigger signal. In addition, the storage module 116 and the airbag 112 are disposed within the housing 102. Therefore, when the data protecting procedure is not correctly canceled, the data within the storage module 116 cannot be directly obtained.

In step 604, the processing module 118 receives the trigger signal generated by the at least one trigger element 106, which indicates that the housing 102 has been destroyed at this moment. The processing module 118 can immediately execute the data protecting procedure to prevent the data from being stolen.

As shown in FIG. 6, in some embodiments, the step of executing the data protecting procedure includes: deleting data in the electronic assembly 10 (step 606). In step 606, when the housing 102 and the airbag 112 are both destroyed, the airbag 112 changes from the inflated state to the collapsed state and separates from the trigger element 106. After any trigger element 106 separates from the airbag 112, the trigger element 106 not pressed by the airbag 112 generates a trigger signal. When receiving the trigger signal, the processing module 118 in the electronic assembly 10 can execute the data protecting procedure based on the trigger signal to clear the data within the storage module 116 of the electronic assembly 10.

Refer to FIG. 7. In an embodiment, the step of executing the data protecting procedure includes: generating another at least one trigger signal in response to another change in the volume of the at least one airbag 112a and/or airbag 112b (or airbag 208) detected in a specified time frame (step 608); determining a generation sequence of the generated another at least one trigger signal (step 610); and determining whether the generation sequence is consistent with a preset rule, in response to the generation sequence being inconsistent with the preset rule, the processing module deletes data in the electronic assembly 10 (or the electronic assembly 20), in response to the generation sequence being consistent with the preset rule, the processing module skips deleting data in the electronic assembly 10 (or the electronic assembly 20) (step 612).

In step 610, the processing module (118, 222) records a generation sequence in which any trigger element (106, 210) generates a trigger signal in the specified time frame. The generation sequence of the trigger signal may be a sequence in which the at least one trigger element (106, 210) generates a trigger signal after the at least one airbag 112a and/or airbag 112b (or airbag 208) respectively actuates the corresponding trigger element (106, 210).

In step 612, the processing module (118, 222) can receive the generation sequence obtained in the specified time frame and compare the generation sequence with the preset rule. The preset rule may be a preset generation sequence. If the generation sequence obtained by the processing module (118, 222) conforms to the preset rule, the processing module (118, 222) does not execute the data protecting procedure to skip deleting the data within the storage module (116, 220). If the generation sequence is inconsistent with the preset rule, the processing module (118, 222) executes the data protecting procedure to clear the data within the storage module (116, 220). In some embodiments, when the generation sequence conforms to the preset rule, the processing module (118, 222) may set a pause protection time. In the pause protection time, an operator can access the data stored within the storage module (116, 220). After the pause protection time ends, the processing module continues the trigger signal detection.

Step 608 and step 610 are described below with reference to FIG. 3. The processing module 118 may record the trigger signal generated by the trigger element 106 corresponding to the airbag 112a as a first trigger signal. In addition, the processing module may record the trigger signal generated by the trigger element 106 corresponding to the airbag 112b as a second trigger signal. E.g., the operator performs two cycles of inflation and deflation on the airbag 112a, and then performs one cycle of inflation and deflation on the airbag 112b. The processing module 118 can obtain a generation sequence recorded as "a first trigger signal, a first trigger signal, and a second trigger signal" based on the trigger sequence. The preset rule for canceling the data protecting procedure may be, e.g., an operation sequence of deflating the airbag 112*a*, inflating the airbag 112*b*, inflating the airbag 112*a*, deflating the airbag 112*a*, and deflating the airbag 112*b*. Gas may be introduced into or exhausted out of the airbag 112*a* through the inflation valve 122*a*, or may be introduced into or exhausted out of the airbag 112*b* through the inflation valve 122*b*. The user may inflate or deflate the corresponding airbag 112*a* or 112*b* in a specific sequence through the corresponding inflation valve 122*a* or 122*b*, so that the trigger elements 106 respectively pressed by the two airbags (112*a* and 112*b*) generate trigger signals to the processing module 118 in a sequence consistent with the generation sequence (a sequence of the signals received by the processing module 118 is: a first trigger signal, a first trigger signal, and a second trigger signal). In step 612, if the processing module 118 determines that the generation sequence of the above trigger signals conforms to the preset rule, the processing module 118 does not delete the data in the electronic assembly 10. On the contrary, the processing module 118 deletes the data in the electronic assembly 10.

Step 608 and step 610 are described below with reference to FIG. 4A. The preset rule for canceling the data protecting procedure may be, e.g., an operation sequence of successively deflating, inflating, inflating, deflating, and deflating the airbag 208. The electronic assembly 20 changes the air pressure of the accommodation space 201 through the inflation valve 230, so that the volume of the airbag 208 changes based on the air pressure of the accommodation space 201. During deflation of the airbag 208, the pressure parameter generated by the trigger element 210 gradually decreases. When the airbag 208 contracts and is separated from the trigger element 210, the trigger element 210 does not generate a trigger signal. When the airbag 208 expands and presses against the trigger element 210, the trigger element 210 can generate a trigger signal. In this way, during execution of step 608 and step 610, the trigger element 210 can generate a corresponding trigger signal based on the operation sequence. In addition, in step 612, if the processing module 222 determines that the generation sequence of the trigger signals conforms to the preset rule, the processing module 222 does not delete the data in the electronic assembly 20. On the contrary, the processing module 222 deletes the data in the electronic assembly 20.

Step 608 and step 610 are described below with reference to FIG. 4B. The preset rule for canceling the data protecting procedure may be, e.g., an operation sequence of successively deflating, inflating, inflating, deflating, and deflating the airbag 208. The electronic assembly 20 changes the air pressure of the accommodation space 201 through the inflation valve 230, so that the volume of the airbag 208 changes based on the air pressure of the accommodation space 201, and the airbag 208 drives the elastic element 228. When the airbag 208 is in the inflated state and the elastic element 228 presses against the trigger element 210, the trigger element 210 does not generate a trigger signal. When the airbag 208 is in the deflated state and the elastic element 228 is separated from the trigger element 210, the trigger element 210 generates a trigger signal. In this way, during execution of step 608 and step 610, the trigger element 210 can successively generate trigger signals based on the operation sequence. In addition, in step 612, if the processing module 222 determines that the generation sequence of the trigger signals conforms to the preset rule, the processing module 222 does not delete the data in the electronic assembly 10. On the contrary, the processing module 222 deletes the data in the electronic assembly 10.

Refer to FIG. 8. In some embodiments, the step of executing the data protecting procedure includes: generating another at least one trigger signal in response to another change in the volume of the at least one airbag 112 (or airbag 208) detected in a specified time frame (step 614); determining a determination parameter of the generated another at least one trigger signal (step 616); and determining whether the determination parameter is consistent with a preset parameter, in response to the determination parameter being inconsistent with the preset parameter, the processing module deletes data in the electronic assembly 10 (or the electronic assembly 20), in response to the determination parameter being consistent with the preset parameter, the processing module skips deleting data in the electronic assembly 10 (or the electronic assembly 20) (step 618).

In some embodiments, in step 614, when the processing module 118 receives the trigger signal (which may be triggered upon a change in the volume of the airbag 112*a* or the airbag 112*b*) for the first time, the processing module 118 can detect a trigger signal actuated by either the airbag 112*a* or the airbag 112*b* in a preset specified time frame. In some embodiments, if only the single airbag 112 (or airbag 208) is disposed with the housing 102, in step 614, the processing module 118 (or the processing module 222) only detects a trigger signal generated by the trigger element 106 actuated by the airbag 112. In another embodiment, if only two airbags (112*a* and 112*b*) are disposed within the housing 102, the processing module 118 detects the trigger signal of the adjacent trigger element 106 triggered by the airbag 112*a* or the airbag 112*b*.

Step 614 and step 616 are described below with reference to FIG. 4A. In this embodiment, the trigger element 210 is a ranging sensor, and the trigger signal includes a distance parameter. The preset rule for canceling the data protecting procedure may be, e.g., an operation sequence of successively deflating the airbag 208 for 10 seconds, inflating the airbag for 25 seconds, inflating the airbag for 20 seconds, deflating the airbag for 15 seconds, and deflating the airbag for 25 seconds. During execution of step 614 and step 616, the electronic assembly 20 changes the air pressure of the accommodation space 201 through the inflation valve 230, so that the volume of the airbag 208 changes based on the air pressure of the accommodation space 201. When the airbag 208 contracts and moves away from the trigger element 210, the distance parameter generated by the trigger element 210 gradually increases. When the airbag 208 expands and moves toward the trigger element 210, the distance parameter generated by the trigger element 210 gradually decreases. In this case, during execution of step 614 and step 616, the electronic assembly 20 successively deflates the accommodation space 201 for 10 seconds, inflates the accommodation space for 25 seconds, inflates the accommodation space for 20 seconds, deflates the accommodation space for 15 seconds, and deflates the accommodation space for 25 seconds through the inflation valve 230. The air pressure in the accommodation space 201 changes based on seconds changes of inflation and deflation, so that the volume of the airbag 208 changes correspondingly. The trigger element 210 can successively generate corresponding distance parameters based on the operations. In addition, in step 618, if the processing module 222 determines that the generation sequence (which may be changes of the distance parameters over time) of the trigger signals (the distance parameters) conforms to the preset rule, the processing module 222 does not execute the data protecting procedure to skip deleting the data within the storage module 220. If the generation sequence is inconsistent with the preset rule, the processing module 222 executes the data protecting procedure the processing module 222 executes the data protecting procedure to delete the data within the storage module 220.

Step 614 and step 616 are described below with reference to FIG. 4B. In this embodiment, the trigger element 210 is a pressure sensor (or a force sensor), and the trigger signal is a pressure parameter (the trigger signal may be a combination of a pressure parameter and a tension parameter). The preset rule for canceling the data protecting procedure may be, e.g., an operation sequence of successively deflating the airbag 208 for 10 seconds, inflating the airbag for 25 seconds, inflating the airbag for 20 seconds, deflating the airbag for 15 seconds, and deflating the airbag for 25 seconds. During execution of step 614 and step 616, the electronic assembly 20 successively deflates the accommodation space 201 for 10 seconds, inflates the accommodation space for 25 seconds, inflates the accommodation space for 20 seconds, deflates the accommodation space for 15 seconds, and deflates the accommodation space for 25 seconds through the inflation valve 230. The air pressure in the accommodation space 201 changes based on seconds changes of inflation and deflation, so that the volume of the airbag 208 changes correspondingly. In addition, the airbag 208 may drive the elastic element 228 to press against or is separated from the trigger element 210. The trigger element 210 can successively generate corresponding pressure parameters (or tension parameters) based on the operation sequence. In addition, in step 618, if the processing module 222 determines that the generation sequence (which may be changes of the pressure parameters over time) of the trigger signals (the pressure parameters) conforms to the preset rule, the processing module 222 does not delete the data in the electronic assembly 20. On the contrary, the processing module 222 deletes the data in the electronic assembly 20.

In step 616, the processing module 118 records a total number of times the at least one trigger element 106 (or the trigger element 210) generates a trigger signal in the specified time frame, and uses the total number of times as the determination parameter. E.g., the operator can perform a plurality of cycles of inflation and deflation (one inflation and one deflation may be defined as one cycle) on the single airbag 112 (or airbag 208). Alternatively, the cycle of inflation and deflation may be performed each of the two airbags (112a and 112b). The processing module 118 (or the processing module 222) records the total number of times the trigger signal is generated as the determination parameter. In some embodiments, if the trigger element 106 generates the trigger signal when pressed by the single airbag 112 (or one of the airbag 112a and the airbag 112b), the processing module 118 can use a trigger signal at a moment of starting counting the specified time frame as a detected first trigger signal.

In step 618, the processing module (118, 222) can receive the trigger signal generated by each trigger element (106, 210) in the specified time frame, and compare the trigger signal with a preset parameter. If the determination parameter received by the processing module (118, 222) is consistent with the preset parameter, the processing module (118, 222) does not execute the data protecting procedure. If the determination parameter received by the processing module (118, 222) is inconsistent with the preset parameter, the processing module (118, 222) executes the data protecting procedure to clear the data within the storage module (116, 220). In some embodiments, when the determination parameter in consistent with the preset parameter, the processing module (118, 222) may set a pause protection time. In the pause protection time, an operator can access the data stored within the storage modules (116, 220). After the pause protection time ends, the processing module continues the trigger signal detection. Alternatively, a protecting instruction is inputted to the processing module (118, 222), so that the processing module (118, 222) continues the trigger signal detection. In this way, when the electronic assembly (10, 20) needs to be repaired or accessed for materials, the operator can first cancel the protecting procedure, to prevent the data within the storage module (116, 220) from being deleted.

Figure 9:
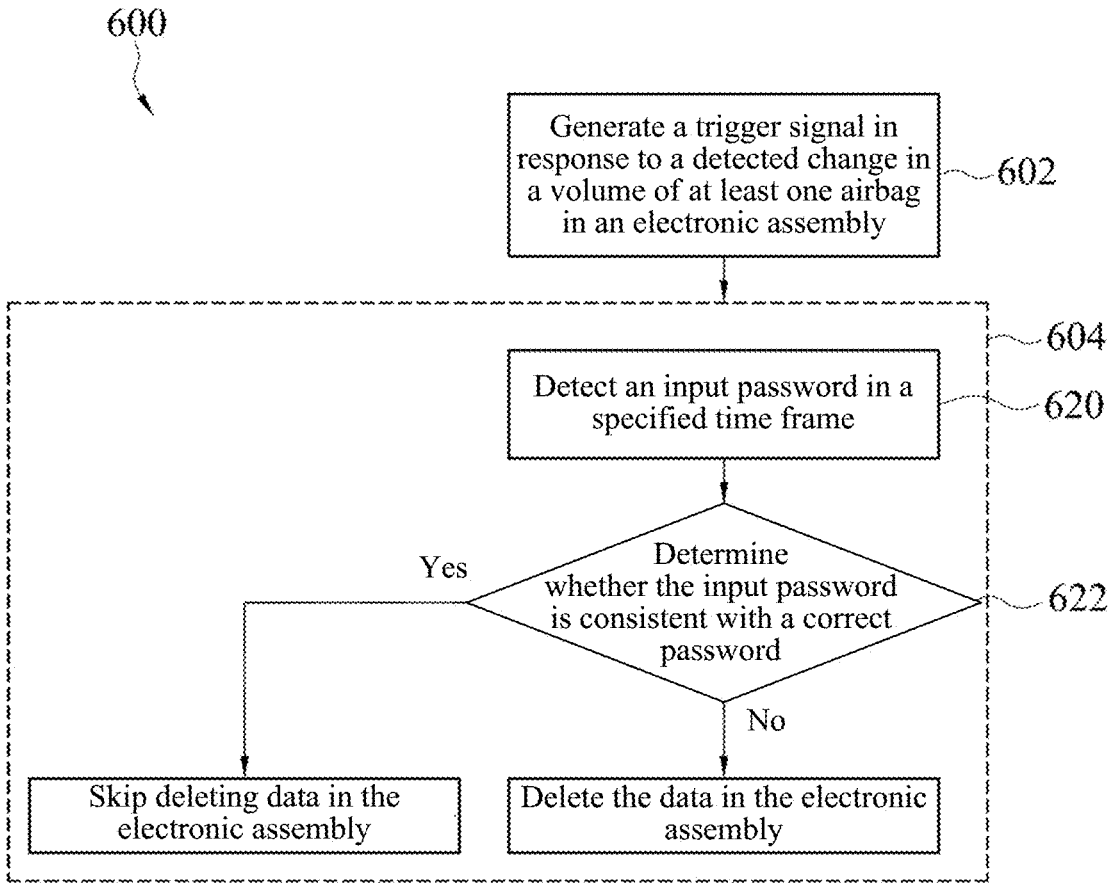

Refer to FIG. 4A, FIG. 4B, and FIG. 9 together. In some embodiments, the step of executing the data protecting procedure includes: detecting an input password in a specified time frame (step 620); and determining whether the input password is consistent with a correct password, in response to the input password being inconsistent with the correct password, the processing module deletes data in the electronic assembly 10 (or the electronic assembly 20), in response to the input password being consistent with the correct password, the processing module skips deleting data in the electronic assembly 10 (or the electronic assembly 20) (step 622).

In step 620, the input password may be a trigger signal (e.g., a pressure parameter or a distance parameter) or a plurality of trigger signals generated when the trigger element 210 is triggered. E.g., when the processing module 222 starts counting the specified time frame, the processing module 222 can detect the trigger signal generated by the trigger element 210 (which may be a ranging sensor, a pressure sensor, or a force sensor) as the input password. The trigger signal may a continuous input password (the input password herein is a distance parameter, a pressure parameter, or a tension parameter) generated in response to the change in the volume of the airbag 208. The pressure parameter is used as an example below. If the input password is a single pressure parameter, the processing module 222 can use a pressure parameter at a moment at which the specified time frame ends as the input password for comparison. If the input password is a combination of a plurality of pressure parameters, the processing module 222 may use a time interval between two successive input passwords as a criterion for determining a password input. E.g., when the processing module 222 detects a first pressure parameter, which remains for 3 seconds (that is, a time interval) and then changes to a second pressure parameter, the processing module 222 can record pressure parameters appearing after every 3 seconds as the input password. Step 620 may be performed after step 602 is completed. In some embodiments, the preset rule may be a combination of a pressure parameter (or may be a combination of a distance parameter or a tension parameter and a pressure parameter) and a time. E.g., when the trigger element 210 is a pressure sensor, the trigger element 210 can generate a corresponding pressure parameter based on an action (deflation for 10 seconds, inflation for 25 seconds, inflation for 20 seconds, deflation for 15 seconds, and deflation for 25 seconds) of the air pressure pump and the inflated state and the deflated state of the airbag 208. In this way, the processing module 222 can perform comparison on the pressure parameter transmitted by the trigger element 210, to determine whether to cancel the data protecting procedure. It should be noted that, the airbag 208 can actuate the trigger element 210 through the elastic element 228, so that the trigger element 210 detects the first pressure parameter or the second pressure parameter. In another embodiment, the airbag 208 can directly actuate the trigger element 210. In an embodiment in which the trigger element 210 is a ranging sensor, the trigger element 210 detects a distance between the airbag 208 and the trigger element 210 to generate a distance parameter, so that the processing module 222 can perform comparison on the distance parameter transmitted by the trigger element 210, to determine whether to cancel the data protecting procedure.

In step 622, the processing module 222 can receive the input password obtained in the specified time frame, and compare the input password with the correct password. The correct password may be a set of preset correct passwords (which may be a single pressure parameter or a combination of a plurality of pressure parameters). If the input password obtained by the processing module 222 is consistent with the correct password, the processing module 222 does not execute the data protecting procedure to skip deleting the data within the storage module 220. If the input password is inconsistent with the correct password, the processing module 222 executes the data protecting procedure to clear the data within the storage module 220. Alternatively, when the processing module 222 does not receive the input password in the specified time frame (which may mean that the pressure parameter received by the processing module 222 remains the value at the moment of starting counting specified time frame), which indicates that the operator is unaware that the electronic assembly with a theft prevention mechanism is equipped with the data protecting procedure, the processing module 222 can execute the data protecting procedure to clear the data stored within the storage module 220.

In some embodiments, the electronic assembly (10, 20) may be, e.g., an on-board computer. The electronic assembly (10, 20) may be disposed within a vehicle and coupled to at least one electronic device and/or on-vehicle electronic system, so that the electronic assembly (10, 20) can receive or provide vehicle-readable data and/or control operation of the vehicle. In some embodiments, the data may be, e.g., a set vehicle parameter, a travelling parameter, or a vehicle safety parameter. Any parameter related to the vehicle may be stored in the electronic assembly (10, 20).

In some embodiments, the trigger element (106, 210) may be, e.g., a dome pushbutton switch, a pressure switch, an ultrasonic switch, or a button switch.

In some embodiments, the substrate (114, 218) may be, e.g., a printed circuit board. To be specific, the substrate (114, 218) is equipped with an electronic circuit, and the storage module (116, 220) and the processing module (118, 222) are connected through the electronic circuit, so that the storage module and the processing module can transmit data or an instruction signal to each other.

Herein, the processing module (118, 222) is configured to process and execute the procedure and the signal in the exemplary embodiments, and can access or load the data and software recorded within the storage module (116, 220). In some embodiments, the first processing module (118, 222) may be implemented by one or more processing assemblies. Each processing assembly may be, e.g., a microprocessor, a microcontroller, a digital signal processor (DSP), a central processing unit (CPU), a programmable logic controller (PLC), an application specific integrated circuit (ASIC), a field programmable gate array (FPGA), or a finite-state machine (FSM). In some embodiments, the processing module 118 may be implemented by an integrated circuit (IC) or a system-on-a-chip (SoC).

In some embodiments, the storage module (116, 220) may be implemented by one or more storage assemblies. Herein, the storage assembly may be, e.g., a memory, a memory card, or a buffer. The data may be pre-written into the storage module (116, 220) before implementation, or may be continuously written into the storage module (116, 220) during implementation. E.g., the data may be continuously written into the storage module (116, 220) when the electronic assembly 10 is electrically connected to the vehicle.

In some embodiments, the warning assembly 120 may be, e.g., a buzzer, an indicator light set, a display, or any combination thereof.

In conclusion, according to any embodiment, in the electronic assembly with a theft prevention mechanism or the data theft prevention method for an electronic assembly, through combination of the airbag 112 and the at least one trigger element 106, the circuit board assembly 104 can be notified and actuated to execute the data protecting procedure of the data when the housing 102 is destroyed, thereby protecting the stored data and avoiding data theft.

Although the present disclosure has been described in considerable detail with reference to certain preferred embodiments thereof, the disclosure is not for limiting the scope of the disclosure. Persons having ordinary skill in the art may make various modifications and changes without departing from the scope and spirit of the disclosure. Therefore, the scope of the appended claims should not be limited to the description of the preferred embodiments described above.

What is claimed is:

1. An electronic assembly with a theft prevention mechanism, comprising: a housing enclosed an accommodation space; a circuit board assembly, disposed within the housing; a limiting assembly, disposed within the housing, wherein a chamber is partitioned by the limiting assembly within the housing, and the chamber is smaller than the housing and is in fluid communication with an interior part of the housing; an airbag, disposed within the chamber; and a trigger element, disposed within the chamber, electrically connected to the circuit board assembly, and a change in a volume of the airbag being detected by an elastic element presses against the trigger element; and an inflation valve embedded in the housing to change an air pressure of the accommodation space and an associated volume of the airbag; and the circuit board assembly includes: a substrate, disposed within the housing; a storage module, disposed on the substrate and a data is stored by the storage module; and a processing module, disposed on the substrate, electrically connected to the storage module and the trigger element, and a data protecting procedure of the data being executed by the processing module based on a detection result of the trigger element.

2. The electronic assembly with a theft prevention mechanism according to claim 1, further comprising: an elastic element, connected to the trigger element and the airbag.

3. The electronic assembly with a theft prevention mechanism according to claim 1, wherein in a normal operating state, an internal air pressure of an airbag of the at least one airbag is greater than or equal to an external air pressure of the airbag, the external air pressure of the airbag is less than a standard atmospheric pressure, and the volume of the airbag is decreased in response to an increase in the external air pressure of the airbag.

4. The electronic assembly with a theft prevention mechanism according to claim 1, wherein in a normal operating state, an internal air pressure of an airbag of the at least one airbag is equal to an external air pressure of the airbag, the external air pressure of the airbag is greater than a standard atmospheric pressure, and the volume of the airbag is increased in response to a decrease in the external air pressure of the airbag.

5. A data theft prevention method for an electronic assembly, comprising: generating a trigger signal in response to a detected change in a volume of one or a plurality of airbags in an electronic assembly; and executing a data protecting procedure of the electronic assembly in response to the trigger signal; and the electronic assembly includes: one or a plurality of inflation valves, the change in the volume of the one or the plurality of airbags being controlled by the one or the plurality of inflation valves, and one or a plurality of trigger elements, the trigger signal being generated by the one or the plurality of trigger elements in response to a detected change in the volume of the one or the plurality of the airbags; and the electronic assembly further includes a circuit board assembly, the circuit board assembly includes a storage module and a processing module, data is stored by the storage module, and the processing module is electrically connected to the storage module and the one or the plurality of trigger elements, and the data protecting procedure of the data is executed by the processing module based on the trigger signal generated by the one or the plurality of trigger elements; and the step of executing the data protecting procedure of data includes: generating at least one other trigger signal in response to another change in the volume of one or a plurality of airbags detected in a specified time frame; determining a generation sequence of the generated at least one other trigger signal; and deleting data in the electronic assembly in response to the generation sequence being inconsistent with a preset rule.

6. The data theft prevention method for an electronic assembly according to claim 5, wherein the step of executing the data protecting procedure includes deleting data in the electronic assembly.

7. The data theft prevention method for an electronic assembly according to claim 5, wherein the step of executing the data protecting procedure includes:

generating at least one other trigger signal in response to another change in the volume of one or a plurality of airbags detected in a specified time frame;

determining a determination parameter of the generated at least one other trigger signal; and deleting data in the electronic assembly in response to the determination parameter being inconsistent with a preset parameter.

8. The data theft prevention method for an electronic assembly according to claim 5, wherein the step of executing the data protecting procedure of data includes:

detecting an input password in a specified time frame, wherein the input password is one or a plurality of pressure parameters; and deleting data in the electronic assembly in response to the input password being inconsistent with a correct password or the input password being not received in a specified time frame.

* * * * *